United States Patent
Mohtar et al.

(10) Patent No.: US 9,708,925 B2
(45) Date of Patent: Jul. 18, 2017

(54) ADJUSTABLE-TRIM CENTRIFUGAL COMPRESSOR, AND TURBOCHARGER HAVING SAME

(71) Applicant: Honeywell International Inc., Morristown, NJ (US)

(72) Inventors: Hani Mohtar, Lorraine (FR); Pascal Villemin, Girancourt (FR); Stephane Pees, Meurthe-et-Moselle (FR); William Joseph Smith, Gardena, CA (US); Aurelien Tingaud, Thaon les vosges (FR); Lionel Toussaint, Vosges (FR)

(73) Assignee: Honeywell International Inc., Morris Plains, NJ (US)

( * ) Notice: Subject to any disclaimer, the term of this patent is extended or adjusted under 35 U.S.C. 154(b) by 267 days.

(21) Appl. No.: 14/573,603

(22) Filed: Dec. 17, 2014

(65) Prior Publication Data

US 2016/0177956 A1    Jun. 23, 2016

(51) Int. Cl.
*F04D 27/00*    (2006.01)
*F01D 17/14*    (2006.01)
(Continued)

(52) U.S. Cl.
CPC .............. *F01D 17/146* (2013.01); *F02C 6/12* (2013.01); *F04D 27/002* (2013.01);
(Continued)

(58) Field of Classification Search
CPC .............. F04D 29/4213; F04D 27/002; F04D 27/0253; F04D 29/464; F04D 29/462;
(Continued)

(56) References Cited

U.S. PATENT DOCUMENTS 3,635,580 A    1/1972    Richardson et al.
4,321,008 A *  3/1982    McCoy ................. F04D 29/464
                                                           335/209
(Continued)

FOREIGN PATENT DOCUMENTS

DE    102004003208 A1 *  8/2005   ........... F01D 17/141
DE    102010026176 A1    1/2012
(Continued)

OTHER PUBLICATIONS

English Abstract of DE 102004003208A1 dated Aug. 2005.*
EPO Extended Search Report and Opinion dated Sep. 29, 2016 in EP Application No. 15199426.6-1607.

*Primary Examiner* — Nathan Zollinger
(74) *Attorney, Agent, or Firm* — John C. James

(57) ABSTRACT

A centrifugal compressor for a turbocharger includes an inlet-adjustment mechanism in an air inlet for the compressor, operable to move between an open position and a closed position in the air inlet. The inlet-adjustment mechanism includes a variable-geometry orifice actuated by a rotatable actuator ring. In the closed position, the orifice's inner diameter is smaller than that of a shroud surface of the compressor housing and therefore dictates the effective inlet diameter for the compressor. In the open position the orifice no longer forms an inner diameter smaller than the shroud surface, so that the effective inlet diameter is determined by the shroud surface.

4 Claims, 18 Drawing Sheets

(51) Int. Cl.
*F04D 29/46* (2006.01)
*F04D 27/02* (2006.01)
*F02C 6/12* (2006.01)

(52) U.S. Cl.
CPC ....... *F04D 27/0253* (2013.01); *F04D 29/464* (2013.01); *F05D 2220/40* (2013.01); *F05D 2250/313* (2013.01); *F05D 2250/51* (2013.01); *F05D 2270/101* (2013.01)

(58) Field of Classification Search
CPC .. F04D 27/003; F04D 27/0246; F01D 17/146; F05D 2250/313; F05D 2250/51; F05D 2220/40; F05D 2270/101; F02C 6/12; F02C 9/20
USPC ............... 415/157, 184, 185; 60/602, 605.1; 417/406
See application file for complete search history.

(56) References Cited

U.S. PATENT DOCUMENTS

| | | | | |
|---|---|---|---|---|
| 4,764,088 | A | * | 8/1988 | Kapich ................ F04D 29/466 415/148 |
| 6,634,174 | B2 | * | 10/2003 | Sumser ................ F02B 37/225 60/602 |
| 2007/0125082 | A1 | * | 6/2007 | Sumser ................ F02B 37/025 60/599 |

FOREIGN PATENT DOCUMENTS

| | | |
|---|---|---|
| DE | 102011121996 B4 | 6/2013 |
| DE | 102013003418 A1 | 8/2014 |
| GB | 957884 A | 5/1964 |
| JP | 2010138765 A | 6/2010 |
| WO | 2013074503 A1 | 5/2013 |

\* cited by examiner

ADJUSTABLE-TRIM CENTRIFUGAL COMPRESSOR, AND TURBOCHARGER HAVING SAME

BACKGROUND OF THE INVENTION

The present disclosure relates to centrifugal compressors, such as used in turbochargers, and more particularly relates to centrifugal compressors in which the effective inlet area or diameter can be adjusted for different operating conditions.

An exhaust gas-driven turbocharger is a device used in conjunction with an internal combustion engine for increasing the power output of the engine by compressing the air that is delivered to the air intake of the engine to be mixed with fuel and burned in the engine. A turbocharger comprises a compressor wheel mounted on one end of a shaft in a compressor housing and a turbine wheel mounted on the other end of the shaft in a turbine housing. Typically the turbine housing is formed separately from the compressor housing, and there is yet another center housing connected between the turbine and compressor housings for containing bearings for the shaft. The turbine housing defines a generally annular chamber that surrounds the turbine wheel and that receives exhaust gas from an engine. The turbine assembly includes a nozzle that leads from the chamber into the turbine wheel. The exhaust gas flows from the chamber through the nozzle to the turbine wheel and the turbine wheel is driven by the exhaust gas. The turbine thus extracts power from the exhaust gas and drives the compressor. The compressor receives ambient air through an inlet of the compressor housing and the air is compressed by the compressor wheel and is then discharged from the housing to the engine air intake.

Turbochargers typically employ a compressor wheel of the centrifugal (also known as "radial") type because centrifugal compressors can achieve relatively high pressure ratios in a compact arrangement. Intake air for the compressor is received in a generally axial direction at an inducer portion of the centrifugal compressor wheel and is discharged in a generally radial direction at an exducer portion of the wheel. The compressed air from the wheel is delivered to a volute, and from the volute the air is supplied to the intake of an internal combustion engine.

The operating range of the compressor is an important aspect of the overall performance of the turbocharger. The operating range is generally delimited by a surge line and a choke line on an operating map for the compressor. The compressor map is typically presented as pressure ratio (discharge pressure Pout divided by inlet pressure Pin) on the vertical axis, versus corrected mass flow rate on the horizontal axis. The choke line on the compressor map is located at high flow rates and represents the locus of maximum mass-flow-rate points over a range of pressure ratios; that is, for a given point on the choke line, it is not possible to increase the flow rate while maintaining the same pressure ratio because a choked-flow condition occurs in the compressor.

The surge line is located at low flow rates and represents the locus of minimum mass-flow-rate points without surge, over a range of pressure ratios; that is, for a given point on the surge line, reducing the flow rate without changing the pressure ratio, or increasing the pressure ratio without changing the flow rate, would lead to surge occurring. Surge is a flow instability that typically occurs when the compressor blade incidence angles become so large that substantial flow separation arises on the compressor blades. Pressure fluctuation and flow reversal can happen during surge.

In a turbocharger for an internal combustion engine, compressor surge may occur when the engine is operating at high load or torque and low engine speed, or when the engine is operating at a low speed and there is a high level of exhaust gas recirculation (EGR). Surge can also arise when an engine is suddenly decelerated from a high-speed condition. Expanding the surge-free operation range of a compressor to lower flow rates is a goal often sought in compressor design.

BRIEF SUMMARY OF THE DISCLOSURE

The present disclosure describes mechanisms and methods for a centrifugal compressor that can enable the surge line for the compressor to selectively be shifted to the left (i.e., surge is delayed to a lower flow rate at a given pressure ratio). One embodiment described herein comprises a turbocharger having the following features:

a turbine housing and a turbine wheel mounted in the turbine housing and connected to a rotatable shaft for rotation therewith, the turbine housing receiving exhaust gas and supplying the exhaust gas to the turbine wheel;

a centrifugal compressor assembly comprising a compressor housing and a compressor wheel mounted in the compressor housing and connected to the rotatable shaft for rotation therewith, the compressor wheel having blades and defining an inducer portion, the compressor housing defining an air inlet for leading air generally axially into the inducer portion of the compressor wheel, the compressor housing further defining a volute for receiving compressed air discharged generally radially outwardly from the compressor wheel, the air inlet having an inner surface that extends for an axial length along a downstream axial direction, followed by a shroud surface that is adjacent to outer tips of the blades of the compressor wheel; and a compressor inlet-adjustment mechanism disposed in the air inlet of the compressor housing and movable between an open position and a closed position.

The inlet-adjustment mechanism comprises a variable-geometry orifice. The variable-geometry orifice in the closed position has an inner diameter that is smaller than an inner diameter of the shroud surface of the compressor housing at the inducer portion of the compressor wheel, and the variable-geometry orifice is positioned such that the effective diameter of the air inlet at the inducer portion is determined by the inner diameter of the variable-geometry orifice. The variable-geometry orifice in the open position is moved such that an effective diameter of the air inlet at the inducer portion is determined by the shroud surface.

In one embodiment the variable-geometry orifice comprises an annular ring formed in two semi-annular halves that are pivotable about a common axis extending transversely to the rotation axis of the compressor wheel. In the closed position the two halves of the ring are substantially co-planar so as to form the annular ring. In the open position the two halves are pivoted in opposite directions so that the halves no longer form an annular ring.

In another embodiment, the variable-geometry orifice comprises concentric outer and inner annular rings each formed in two semi-annular halves, all four of the halves being pivotable about a common axis extending transversely to the rotation axis of the compressor wheel. In the closed position the two halves of the outer ring are substantially co-planar so as to form the outer annular ring and the two halves of the inner ring are substantially co-planar so as to form the inner annular ring, such that the effective diameter of the air inlet at the inducer portion of the compressor wheel is dictated by the inner diameter of the inner annular ring. The orifice has a partially open position in which the two halves of the inner annular ring are pivoted in opposite directions so that the halves no longer form the inner annular ring, but the two halves of the outer annular ring are still co-planar to form the outer annular ring, such that the effective diameter of the air inlet at the inducer portion of the compressor wheel is dictated by the inner diameter of the outer annular ring. The orifice has a fully open position in which the two halves of the inner annular ring are pivoted in opposite directions so that the halves no longer form the inner annular ring, and in which the two halves of the outer annular ring are pivoted in opposite directions so that the halves no longer form the outer annular ring, such that the effective diameter of the air inlet at the inducer portion of the compressor wheel is dictated by the shroud surface of the compressor housing.

The concept of multiple concentric annular rings can be extended to more than two such rings in substantially similar fashion to that described above.

In a further embodiment, the variable-geometry orifice comprises a first annular ring that has a first inner diameter and that lies in a plane and is pivotable about a pivot axis extending transversely to a rotation axis of the compressor wheel, and a second annular ring that lies in a plane angularly displaced about said pivot axis from the plane of the first annular ring and that has a second inner diameter larger than that of the first annular ring. The first and second annular rings are pivotable as a unit about said pivot axis. In the closed position the plane in which the first annular ring lies is perpendicular to the rotation axis of the compressor wheel such that the effective diameter of the air inlet at the inducer portion of the compressor wheel is dictated by the first inner diameter of the first annular ring. In a partially open position the annular rings are pivoted about said pivot axis such that the plane in which the second annular ring lies is perpendicular to the rotation axis such that the effective diameter of the air inlet at the inducer portion of the compressor wheel is dictated by the second inner diameter of the second annular ring. In a fully open position the annular rings are pivoted such that neither of the planes of the first and second annular rings is perpendicular to the rotation axis and consequently the effective diameter of the air inlet is dictated by the shroud surface of the compressor wheel at the inducer portion.

In yet another embodiment, the variable-geometry orifice comprises a plurality of arcuate part-ring segments that collectively form a full annular ring, the segments being movable radially inwardly and outwardly. In the closed position the segments are moved radially inwardly to form the annular ring, such that the effective diameter of the air inlet at the inducer portion of the compressor wheel is dictated by the inner diameter of the annular ring. In the open position the segments are moved radially outwardly, such that the effective diameter of the air inlet at the inducer portion of the compressor wheel is dictated by the shroud surface of the compressor housing.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 13A is a perspective view of the rotatable actuator ring and ring segments, in the closed position;

FIG. 15A is a view similar to FIG. 13A, in the open position; and

DETAILED DESCRIPTION OF THE DRAWINGS

The present inventions now will be described more fully hereinafter with reference to the accompanying drawings, in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
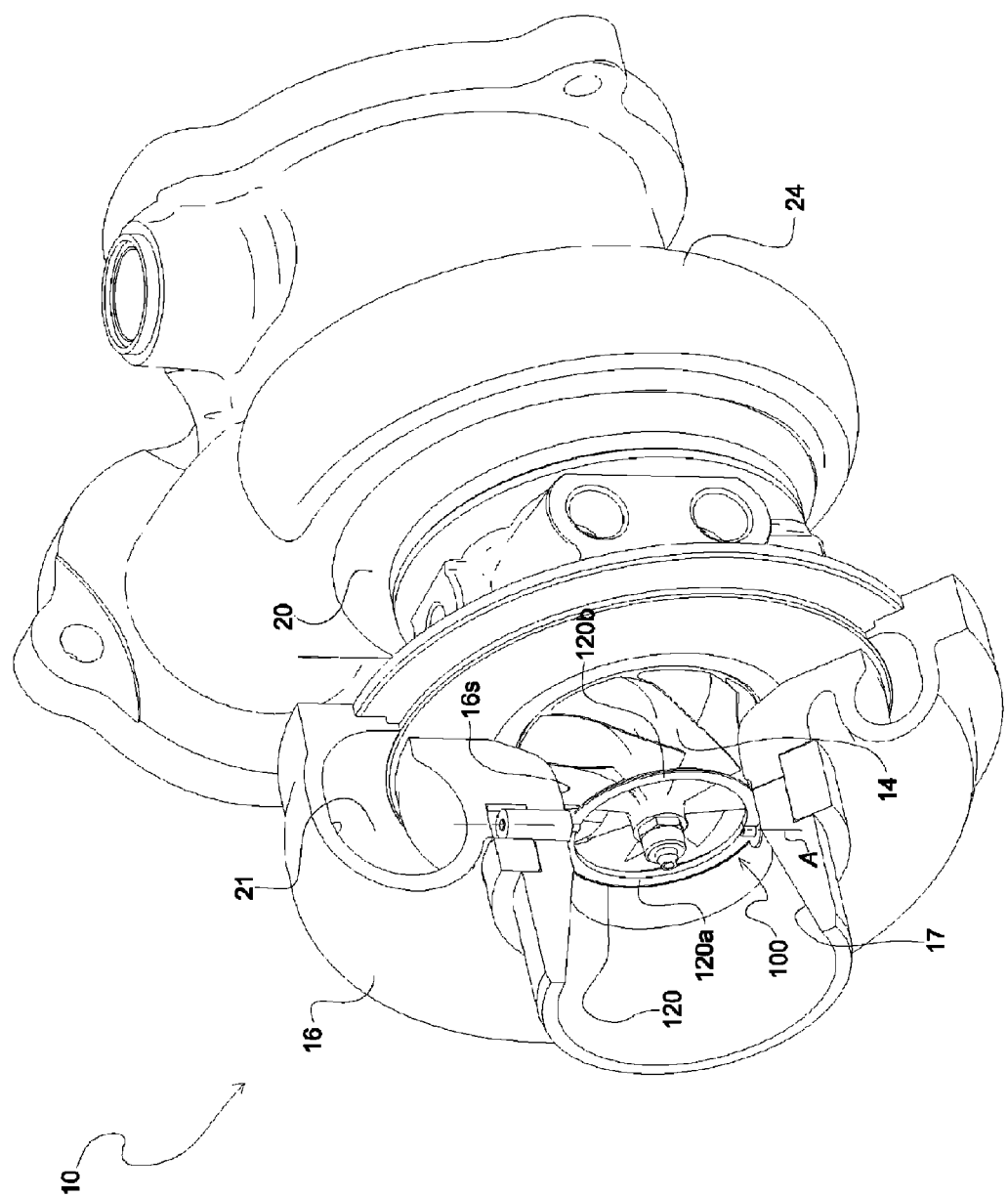
FIG. 1 is a perspective view of a turbocharger, with a portion of the compressor housing cut away to show internal details, in accordance with one embodiment of the invention, wherein the inlet-adjustment mechanism is in the closed position.
Figure 2:
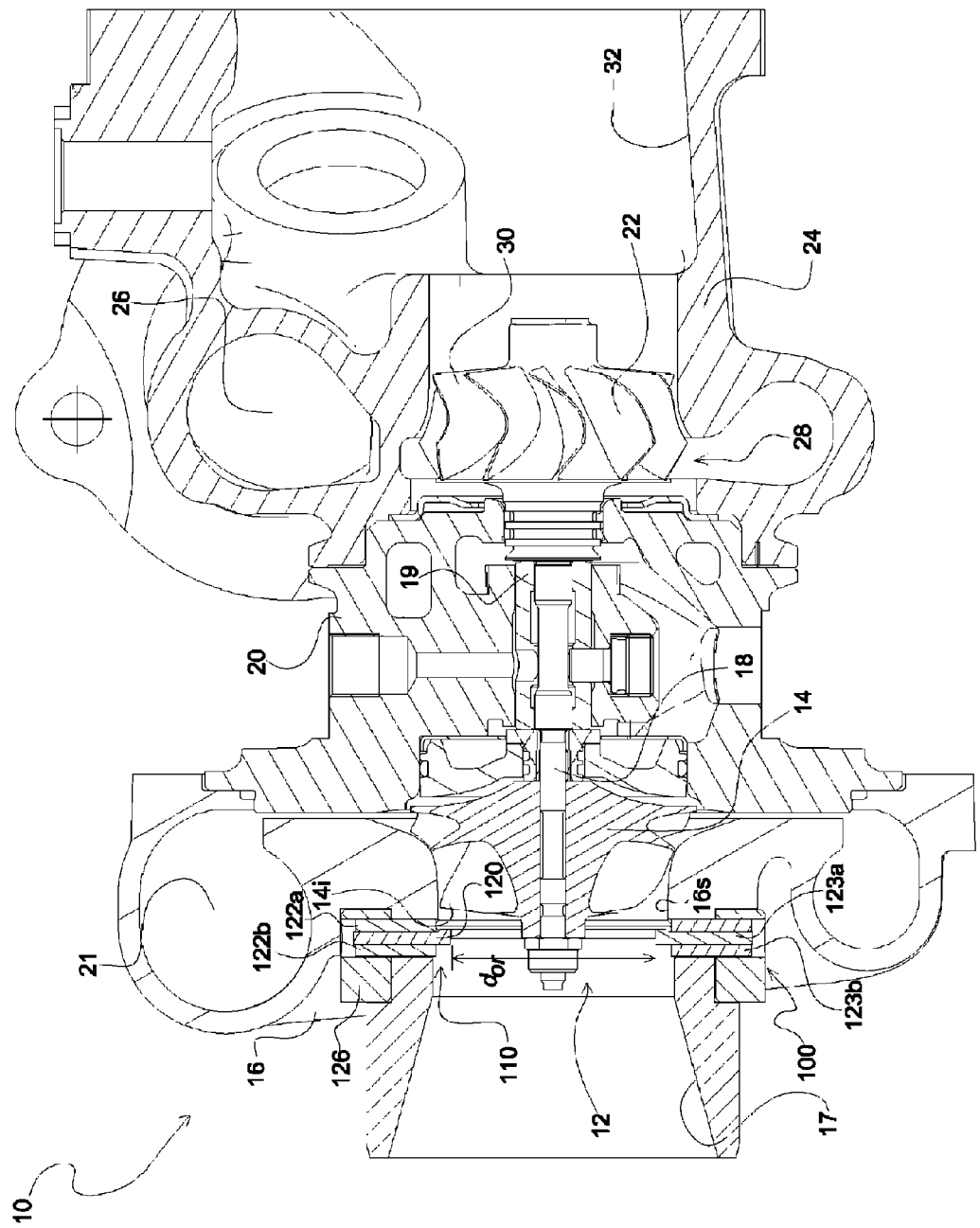
FIG. 2 is an axial cross-sectional view of the turbocharger of FIG. 1, with the inlet-adjustment mechanism in the closed position.

A turbocharger 10 in accordance with one embodiment of the invention is illustrated in cross-sectional view in FIG. 2, and in perspective view in FIG. 1. The turbocharger comprises a compressor 12 having a compressor wheel or impeller 14 mounted in a compressor housing 16 on one end of a rotatable shaft 18. The compressor housing defines an air inlet 17 for leading air generally axially into the compressor wheel 14. The shaft 18 is supported in bearings 19 mounted in a center housing 20 of the turbocharger. The shaft 18 is rotated by a turbine wheel 22 mounted on the other end of the shaft 18 from the compressor wheel, thereby rotatably driving the compressor wheel, which compresses air drawn in through the compressor inlet and discharges the compressed air generally radially outwardly from the compressor wheel into a volute 21 for receiving the compressed air. From the volute 21, the air is routed to the intake of an internal combustion engine (not shown) for boosting the performance of the engine.

The compressor housing 16 defines a shroud surface 16s that is closely adjacent to the radially outer tips of the compressor blades. The shroud surface 16s defines a curved contour that is generally parallel to the contour of the compressor wheel. At the inlet to the inducer portion 14i of the compressor wheel, the shroud surface 16s has a diameter that is slightly greater than the diameter of the inducer portion 14i.

The turbocharger further includes a turbine housing 24 that houses the turbine wheel 22. The turbine housing defines a generally annular chamber 26 that surrounds the turbine wheel and that receives exhaust gas from the internal combustion engine for driving the turbine wheel. The exhaust gas is directed from the chamber 26 generally radially inwardly through a turbine nozzle 28 to the turbine wheel 22. As the exhaust gas flow through the passages between the blades 30 of the turbine wheel, the gas is expanded to a lower pressure, and the gas discharged from the wheel exits the turbine housing through a generally axial bore 32 therein.

In accordance with the invention, the compressor of the turbocharger includes an inlet-adjustment mechanism 100 disposed in the air inlet 17 of the compressor housing and movable between an open position (FIGS. 3 and 4) and a closed position (FIGS. 1 and 2). The inlet-adjustment mechanism comprises variable-geometry orifice 110. The variable-geometry orifice in the closed position has an inner diameter $d_{or}$ that is smaller than an inner diameter of the shroud surface 16s of the compressor housing at the inducer portion of the compressor wheel, and the variable-geometry orifice in the closed position is positioned such that the effective diameter of the air inlet at the inducer portion is determined by the inner diameter $d_{or}$ of the variable-geometry orifice. The variable-geometry orifice in the open position is moved away from the inducer portion 14i such that an effective diameter of the air inlet at the inducer portion is determined by the shroud surface 16s.

The variable-geometry orifice 110 is spaced upstream of the inducer 14i of the compressor wheel 14 by as small a distance as practicable so as to maximize the effect of the orifice on the effective diameter of the air inlet at the inducer portion.

Figure 2C:
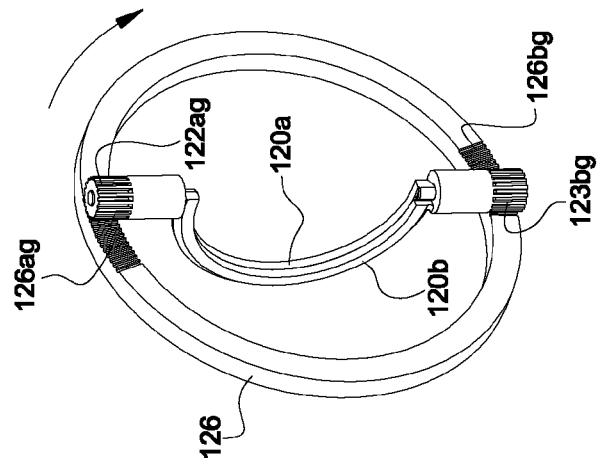
FIG. 2C is similar to FIG. 2B, showing the open position of the inlet-adjustment mechanism (i.e., with no trim reduction)
Figure 2B:
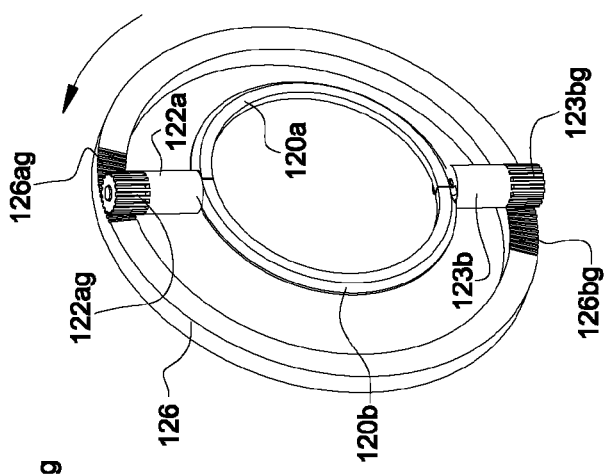
FIG. 2B is a perspective view of the portion of the inlet-adjustment mechanism in the closed position (i.e., with trim reduction)
Figure 2A:
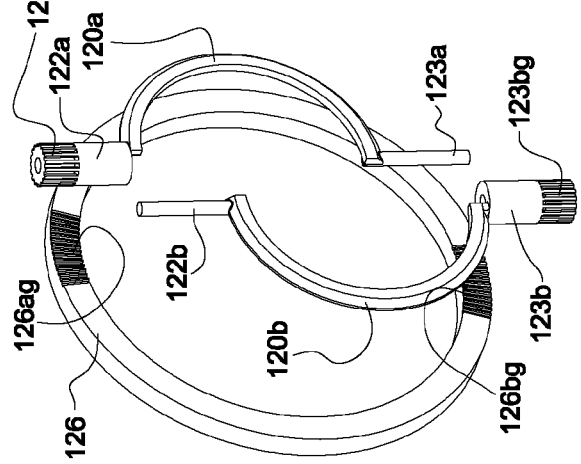
FIG. 2A is an exploded view of a portion of the inlet-adjustment mechanism in accordance with the embodiment of FIG. 1.

More particularly, in the embodiment of FIGS. 1-4, the variable-geometry orifice 110 comprises an annular ring 120 formed in two semi-annular halves 120a and 120b that are pivotable about a common axis A (FIG. 1) extending transversely to the rotation axis of the compressor wheel (i.e., the axis of the shaft 18). With particular reference to FIGS. 2A-C, the ring half 120a is attached to axles 122a and 123a at diametrically opposite positions of the ring half. The other ring half 120b is attached to axles 122b and 123b at diametrically opposition positions of the ring half. The axle 122a has a central bore in which the axle 122b is received so that the axle 122b can rotate in that bore. The axle 123b has a central bore in which the axle 123a is received so that the axle 123a can rotate within that bore. The axle 122a at its radially outer portion has a gear 122ag that engages a gear 126ag on a rotatable actuator ring 126 disposed adjacent to the axle 122a, and the axle gear 122ag is meshed with the ring gear 126ag. The axle gear 122ag extends circumferentially for a sufficient angular extent so that it remains meshed with the ring gear 126ag throughout a 90-degree rotation of the ring half 120a, which is effected by rotating the actuator ring 126 about its central axis. Similarly, the axle 123b at its radially outer portion has a gear 123bg that engages a gear 126bg on the rotatable actuator ring 126 disposed adjacent to the axle 123b, and the axle gear 123bg is meshed with the ring gear 126bg. The axle gear 123bg extends circumferentially for a sufficient angular extent so that it remains meshed with the ring gear 126bg throughout a 90-degree rotation of the ring half 120b, which is effected by rotating the actuator ring 126 about its central axis. As shown in FIG. 2B, when the actuator ring 126 is rotated in one direction, the ring halves 120a and 120b are pivoted to the closed position. When the actuator ring is rotated in the other direction as in FIG. 2C, the ring halves are pivoted to the open position.

In the closed position of FIGS. 1, 2, and 2B, the two halves 120a,b of the ring are substantially co-planar so as to form the annular ring 120. In this position, the orifice 110 defines the inner diameter $d_{or}$ so that the effective inlet diameter into the inducer portion 14i is reduced relative to what it would be without the orifice present.

Figure 3:
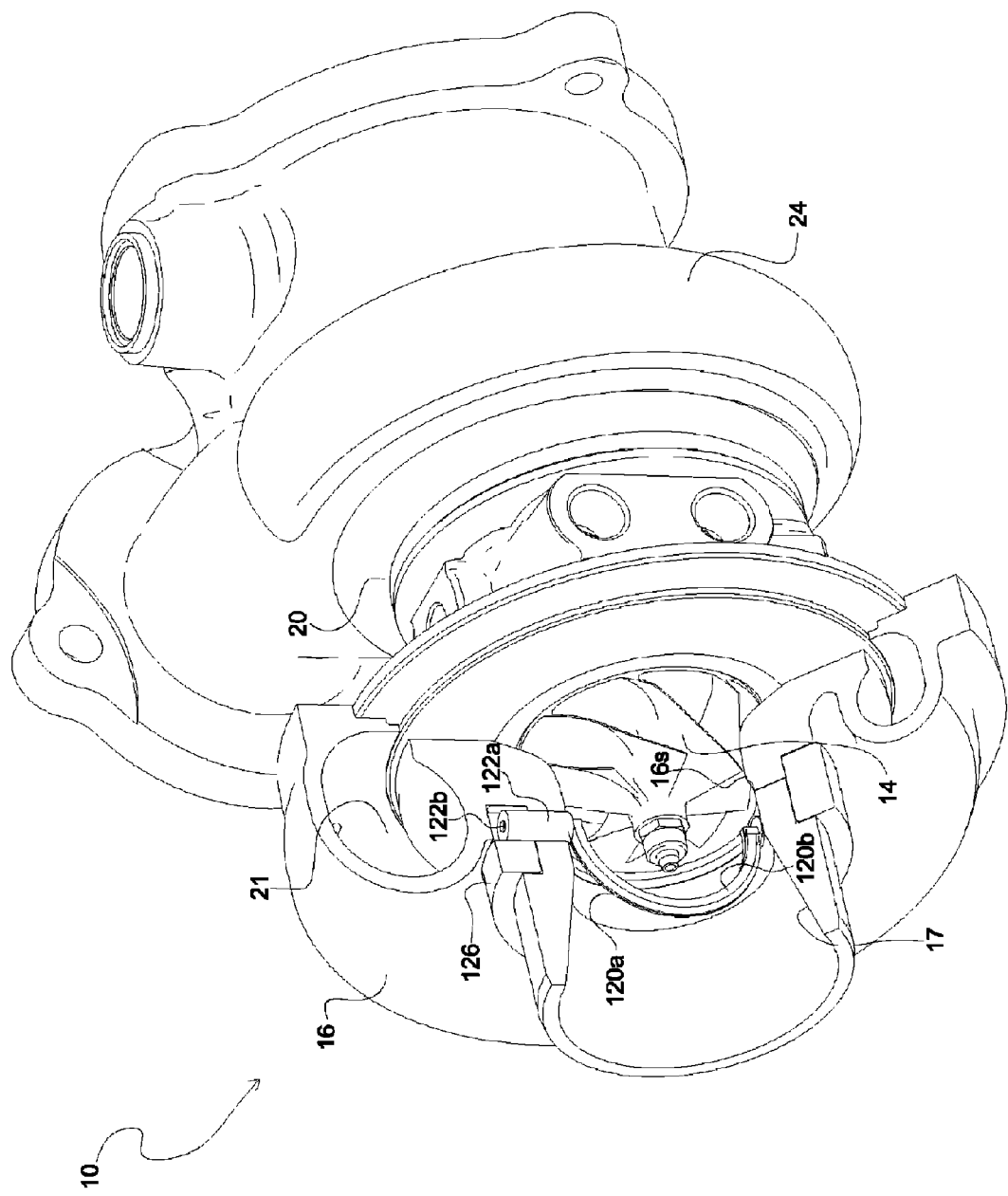
FIG. 3 is a view similar to FIG. 1, but with the inlet-adjustment mechanism in the open position.
Figure 4:
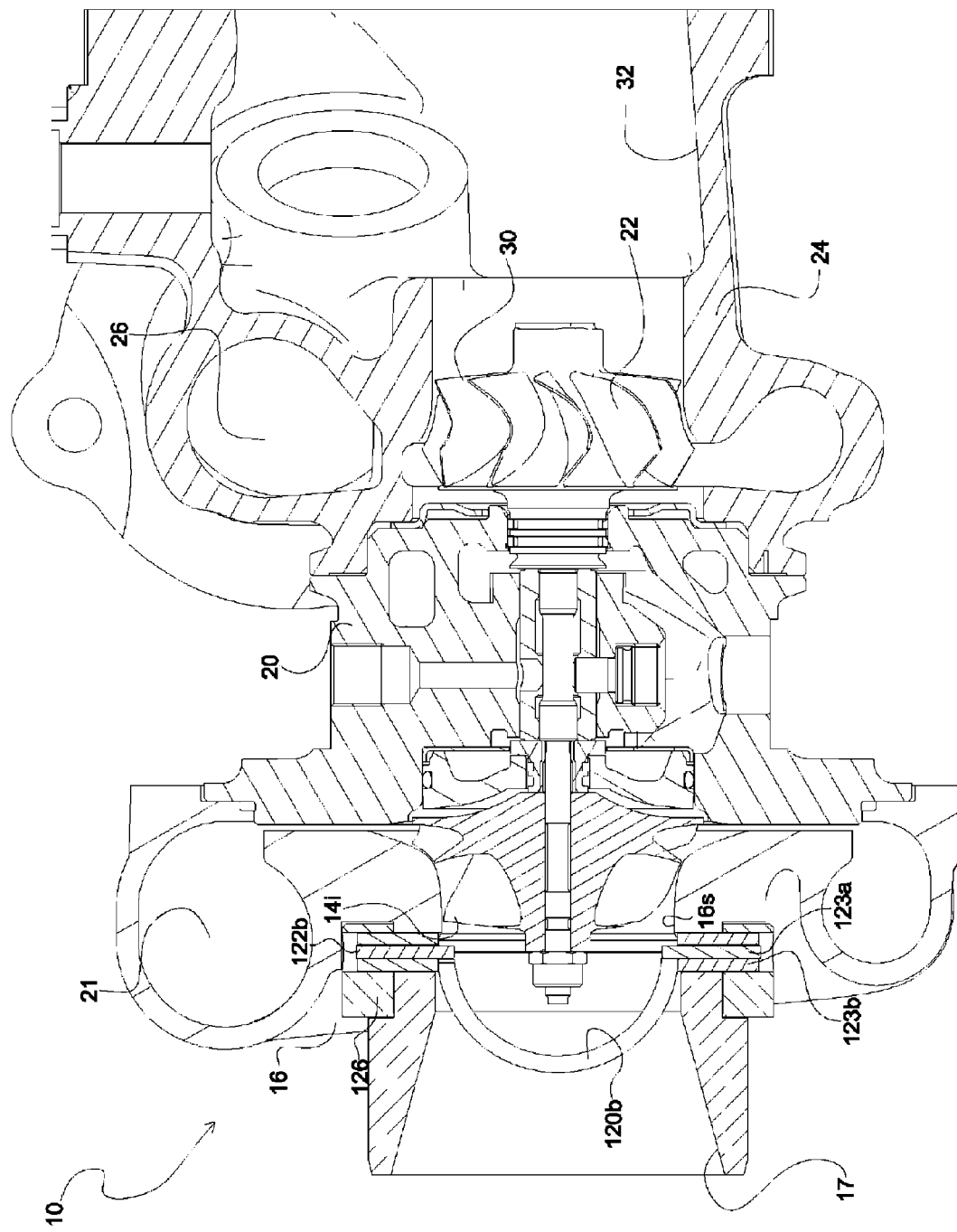
FIG. 4 is view similar to FIG. 2, but with the inlet-adjustment mechanism in the open position.

In the open position of FIGS. 2C, 3, and 4, the two halves 120a,b are pivoted in opposite directions so that the halves no longer form an annular ring. As best seen in FIG. 3, in this open position, the ring halves present a relatively small impediment to the flow and therefore the flow fills the entire inlet 17 so that the effective inlet diameter is dictated by that of the shroud surface 16s of the compressor housing. In the open position, the rings are oriented parallel to the flow in the inlet. The configuration of the rings should be optimized in order to minimize losses. For example, the rings can be designed to be thin at their outer and inner diameters (TE & LE when parallel to flow), to minimize flow separation and distortion at the wheel inlet.

At low flow rates (e.g., low engine speeds), the inlet-adjustment mechanism 100 can be placed in the closed position of FIGS. 1, 2, and 2B. This can have the effect of reducing the effective inlet diameter and thus of increasing the flow velocity into the compressor wheel. The result will be a reduction in compressor blade incidence angles, effectively stabilizing the flow (i.e., making blade stall and compressor surge less likely). In other words, the surge line of the compressor will be moved to lower flow rates (to the left on a map of compressor pressure ratio versus flow rate).

At intermediate and high flow rates, the inlet-adjustment mechanism 100 can be opened as in FIGS. 2C, 3, and 4. Hence, the compressor regains its high-flow performance and choke flow essentially as if the inlet-adjustment mechanism were not present and as if the compressor had a conventional inlet matched to the wheel diameter at the inducer portion of the wheel.

A second embodiment of the invention is illustrated in FIGS. 5-10. The turbocharger 10' of the second embodiment is generally similar to the first embodiment described above, except for the configuration of the inlet-adjustment mechanism 200. The inlet-adjustment mechanism 200 of the second embodiment comprises a variable-geometry orifice that essentially includes two annular rings, namely an outer ring 220 and an inner ring 224 each of which is formed in two halves, all of the ring halves being pivotable about a common axis extending transversely to the rotation axis of the compressor wheel, similar to the first embodiment above. Thus, the outer ring 220 is formed in two halves 220a and 220b. With particular reference to FIG. 6A-C, the ring half 220a is attached to axles 222a and 223a at diametrically opposite positions of the ring half. The other ring half 220b is attached to axles 222b and 223b at diametrically opposition positions of the ring half. The axle 222a has a central bore in which the axle 222b is received so that the axle 222b can rotate in that bore. The axle 223b has a central bore in which the axle 223a is received so that the axle 223a can rotate within that bore. The axle 222a at its radially outer portion has a gear 222ag that engages a gear 226ag on a rotatable first actuator ring 226 disposed adjacent to the axle 222a, and the axle gear 222ag is meshed with the ring gear 226ag. The axle gear 222ag extends circumferentially for a sufficient angular extent so that it remains meshed with the ring gear 226ag throughout a 90-degree rotation of the ring half 220a, which is effected by rotating the first actuator ring 226 about its central axis. Similarly, the axle 223b at its radially outer portion has a gear 223bg that engages a gear 226bg on the first actuator ring 126 disposed adjacent to the axle 223b, and the axle gear 223bg is meshed with the ring gear 226bg. The axle gear 223bg extends circumferentially for a sufficient angular extent so that it remains meshed with the ring gear 226bg throughout a 90-degree rotation of the ring half 220b, which is effected by rotating the first actuator ring 226 about its central axis.

The two halves 224a and 224b of the inner ring 224 are similarly actuated by a second actuator ring 228 that has gears 228ag and 228bg respectively engaged with gears 225ag and 227bg formed on axles 225a and 227b respectively attached to the ring halves 224a and 224b. The axle 225a is received in a central bore of the axle 222b and it rotatable therein, and the axle 227b is received in a central bore of the axle 223a and is rotatable therein.

As shown in FIG. 6B, when the first actuator ring 226 is rotated in one direction, the inner ring halves 224a and 224b are pivoted to their open position; rotating the ring 226 in the other direction pivots the ring halves 224a,b to their closed position as in FIG. 6A. As shown in FIG. 6C, when the second actuator ring 228 is rotated in one direction, the outer ring halves 220a and 220b are pivoted to their open position; rotating the ring 226 in the other direction pivots the ring halves 220a,b to their closed position as in FIG. 6A.

Figure 5:
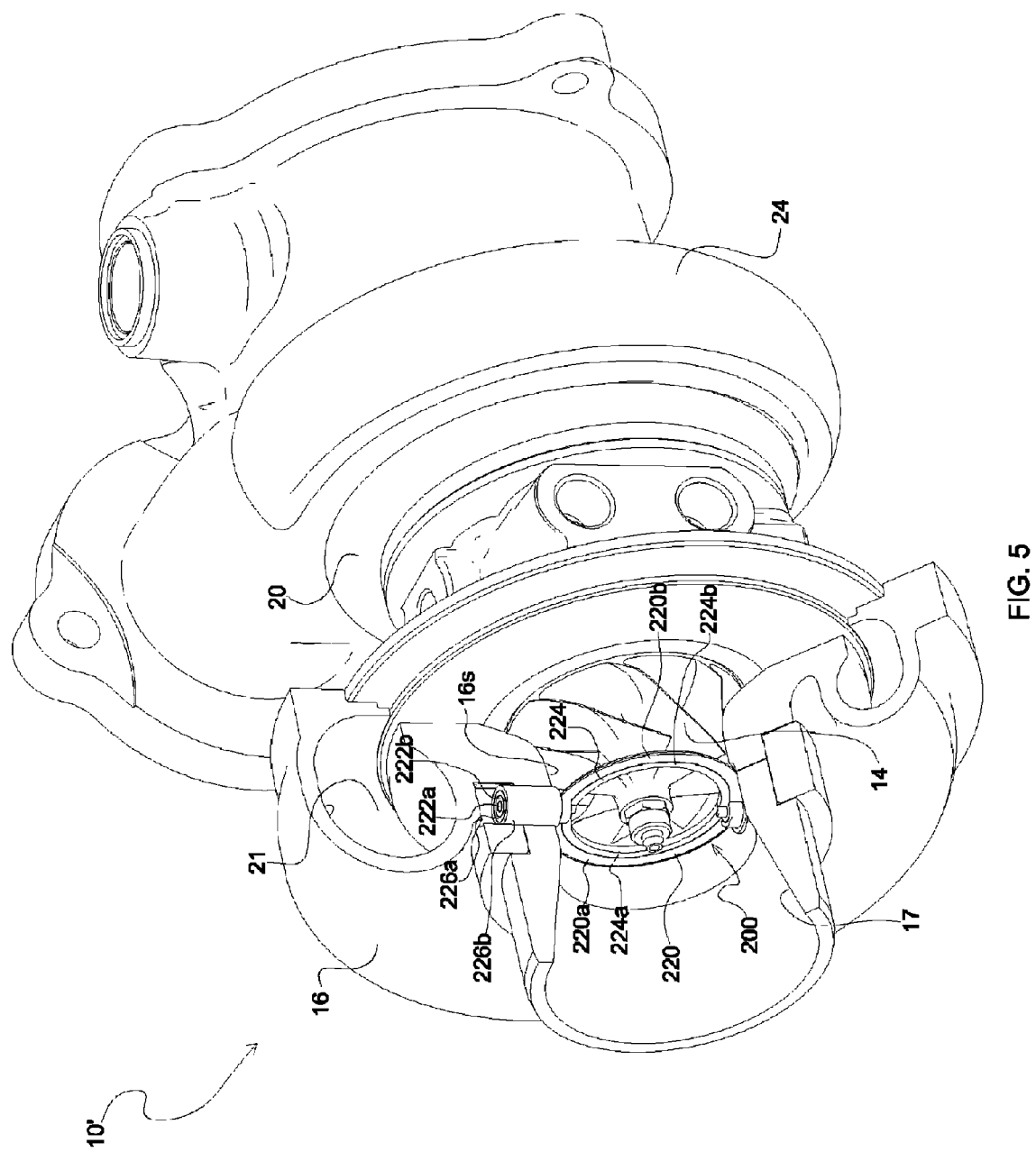
FIG. 5 is a perspective view of a turbocharger, with a portion of the compressor housing cut away to show internal details, in accordance with another embodiment of the invention, wherein the inlet-adjustment mechanism is in the closed position.
Figure 6:
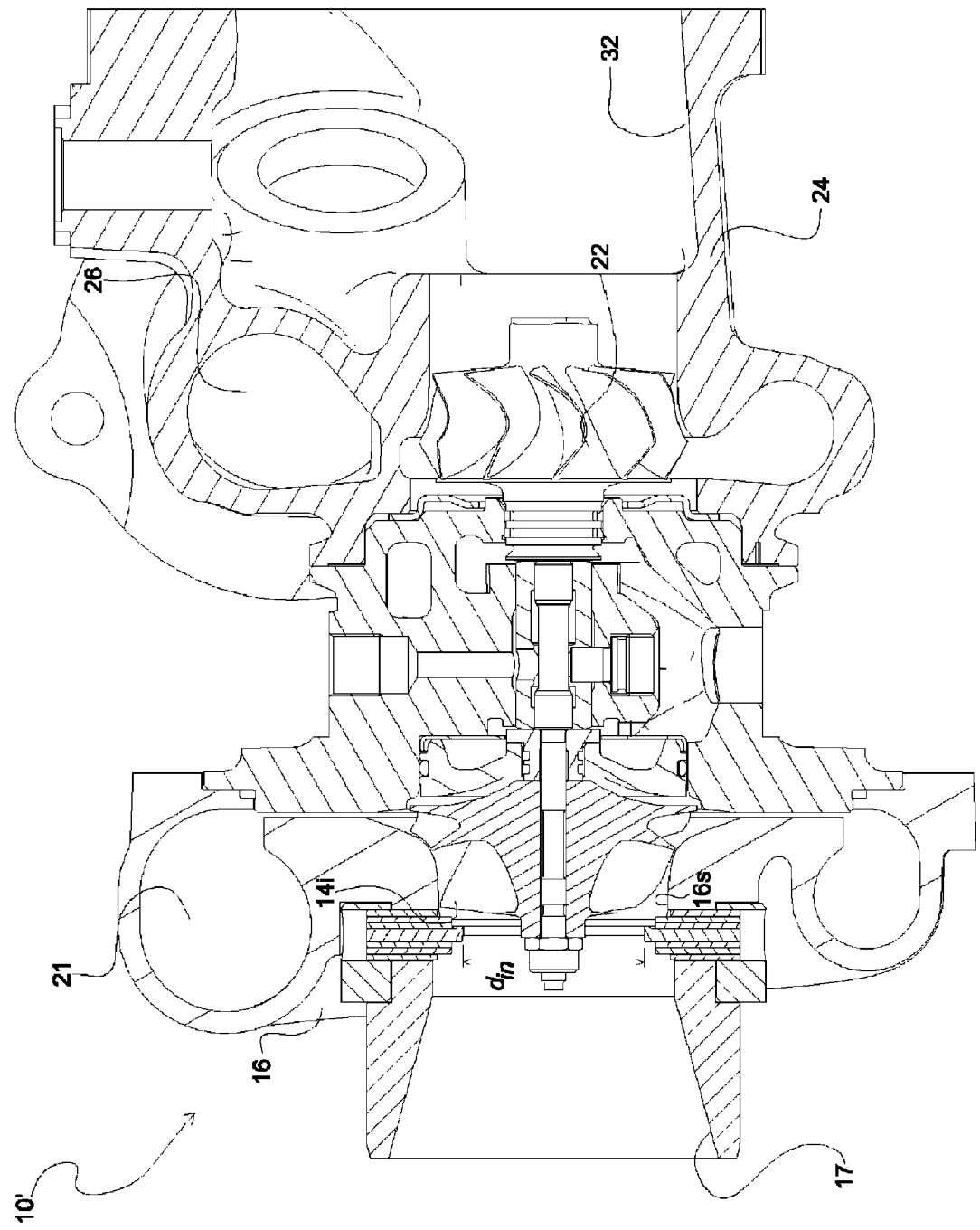
FIG. 6 is an axial cross-sectional view of the turbocharger of FIG. 5, with the inlet-adjustment mechanism in the closed position.
Figure 6C:
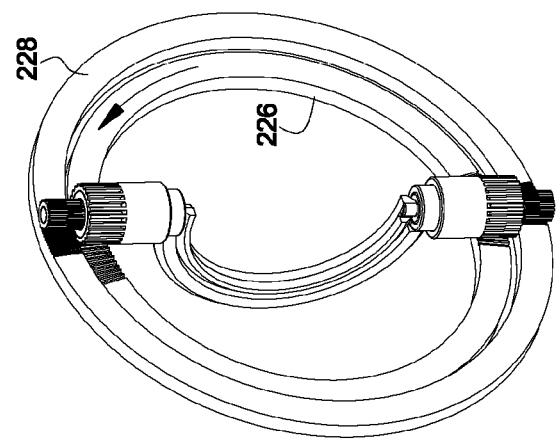
FIG. 6C is similar to FIGS. 6A and 6B, with the inlet-adjustment mechanism in a fully open position (i.e., no trim reduction)
Figure 6B:
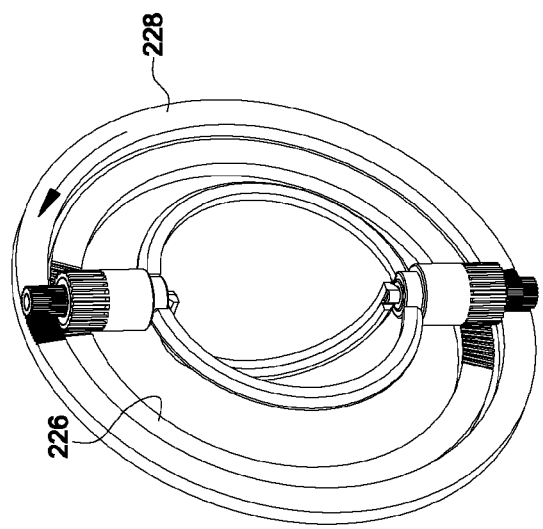
FIG. 6B is similar to FIG. 6A, showing the inlet-adjustment mechanism in a partially open position (i.e., intermediate trim reduction)
Figure 6A:
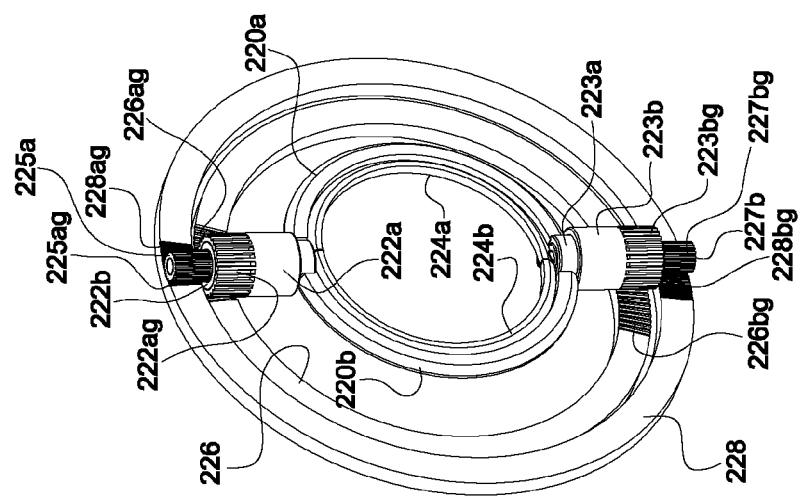
FIG. 6A is a perspective view of the inlet-adjustment mechanism in accordance with the embodiment of FIG. 5, in the closed position (i.e., maximum trim reduction)

In the closed position of FIGS. 5 and 6A, the two halves 220a,b of the outer ring are substantially co-planar so as to form the outer ring 220, and the two halves 224a,b of the inner ring are substantially co-planar so as to form the inner ring 224. In this position, as shown in FIG. 6, the two rings 220 and 224 act as a single ring having an inner diameter $d_{in}$ equal to that of the inner ring 224. Thus, the orifice as a whole has the inner diameter $d_{in}$ so that the effective inlet diameter into the inducer portion 14i is dictated by the inner diameter of the inner ring. This is the maximum trim reduction position.

Figure 7:
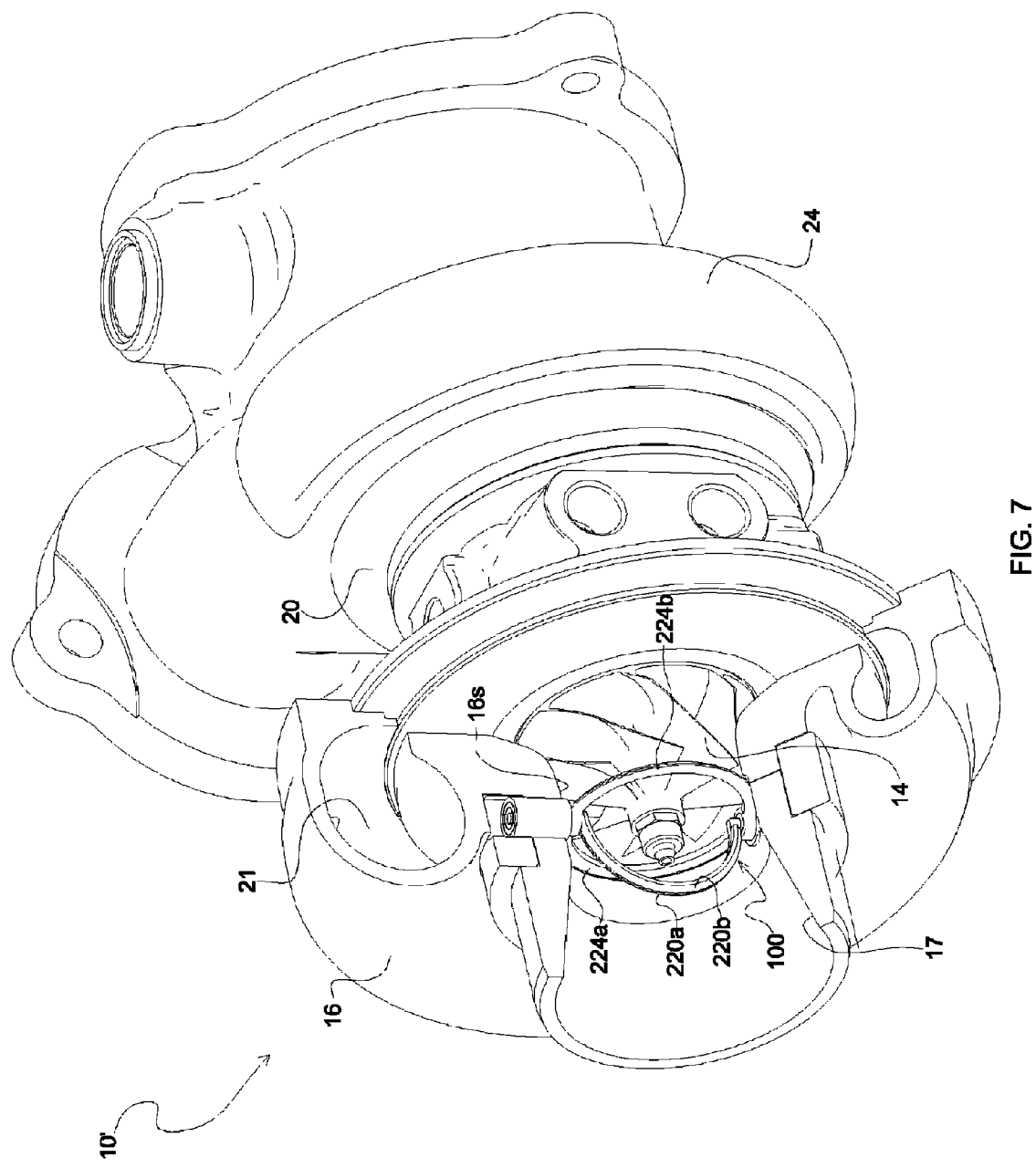
FIG. 7 is a view similar to FIG. 5, but with the inlet-adjustment mechanism in the partially open position.
Figure 8:
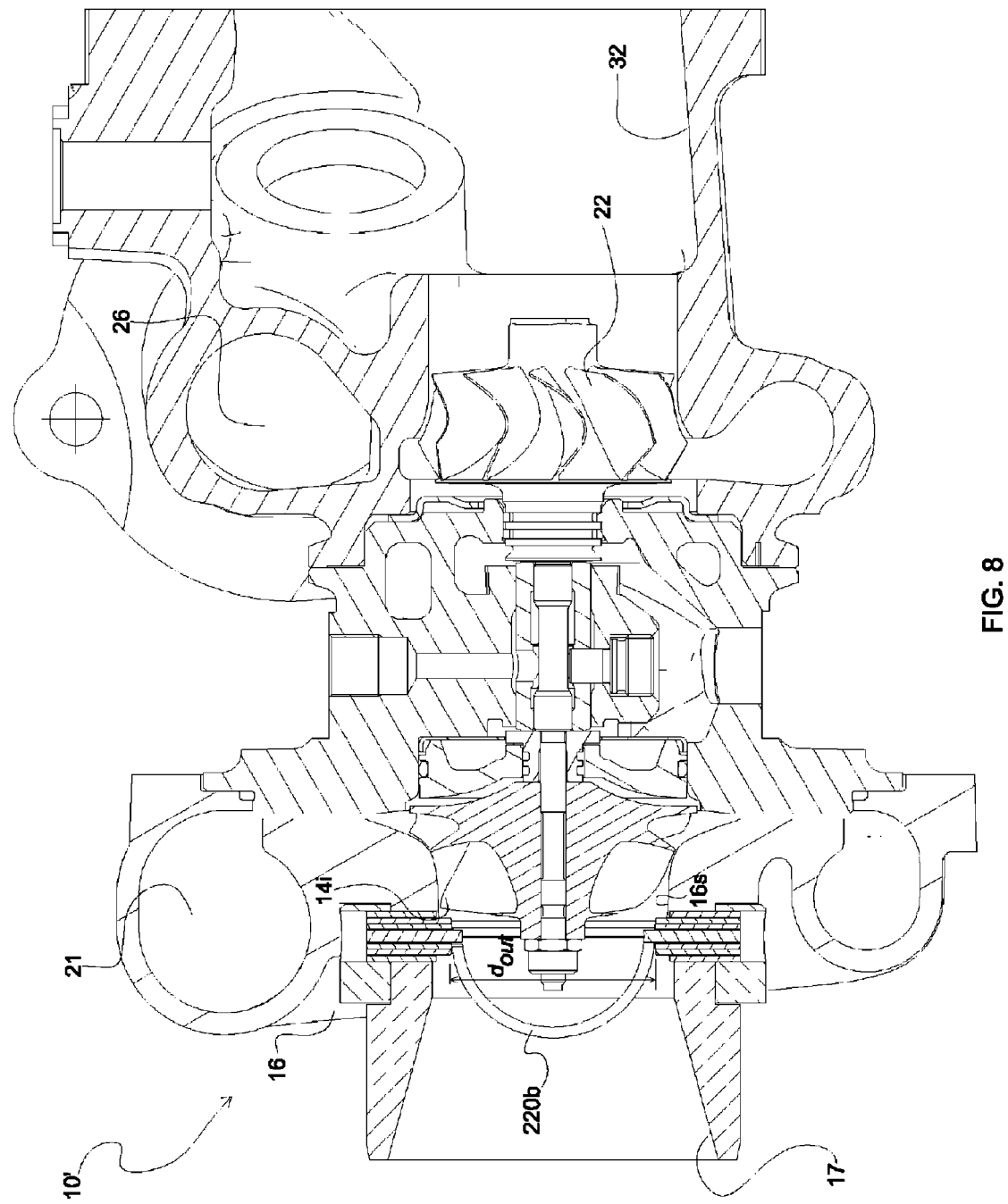
FIG. 8 is a view similar to FIG. 6, with the inlet-adjustment mechanism in the partially open position.

This embodiment also enables a partially open position (i.e., intermediate trim reduction) of the inlet-adjustment mechanism, as illustrated in FIGS. 6B, 7, and 8. The partially open position is characterized by the halves 224a,b of the inner ring being pivoted in opposite directions so that they no longer form an annular ring, while the halves 220a,b of the outer ring are still co-planar and form the outer ring. The halves of the inner ring thus no longer form a significant impediment to flow because they are generally aligned with the flow, and therefore the orifice diameter is defined by the inner diameter $d_{out}$ of the outer ring, as best seen in FIG. 8. The effective inlet diameter into the inducer portion 14i thus is dictated by $d_{out}$.

Figure 9:
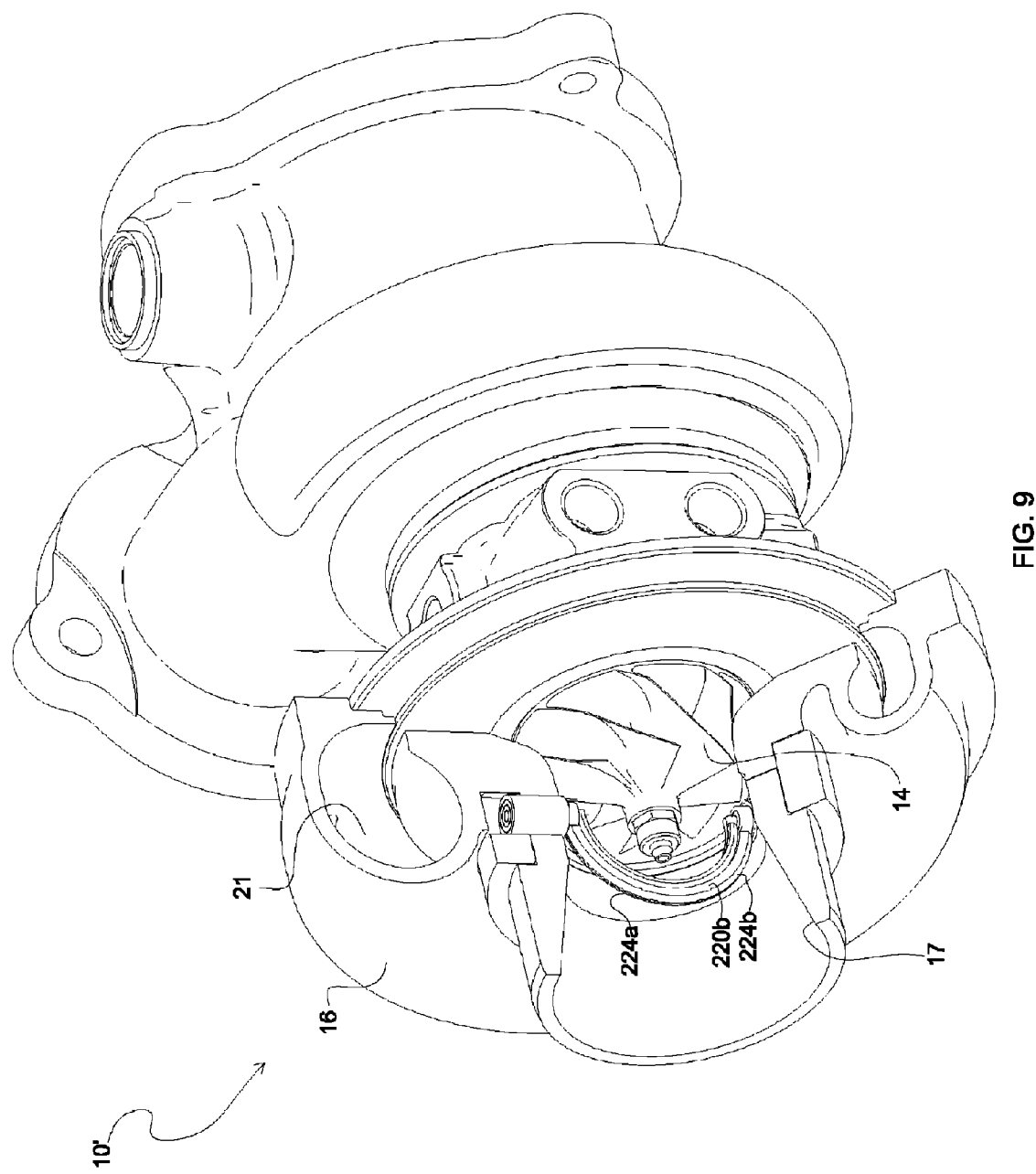
FIG. 9 is a view similar to FIG. 5, but with the inlet-adjustment mechanism in the fully open position.
Figure 10:
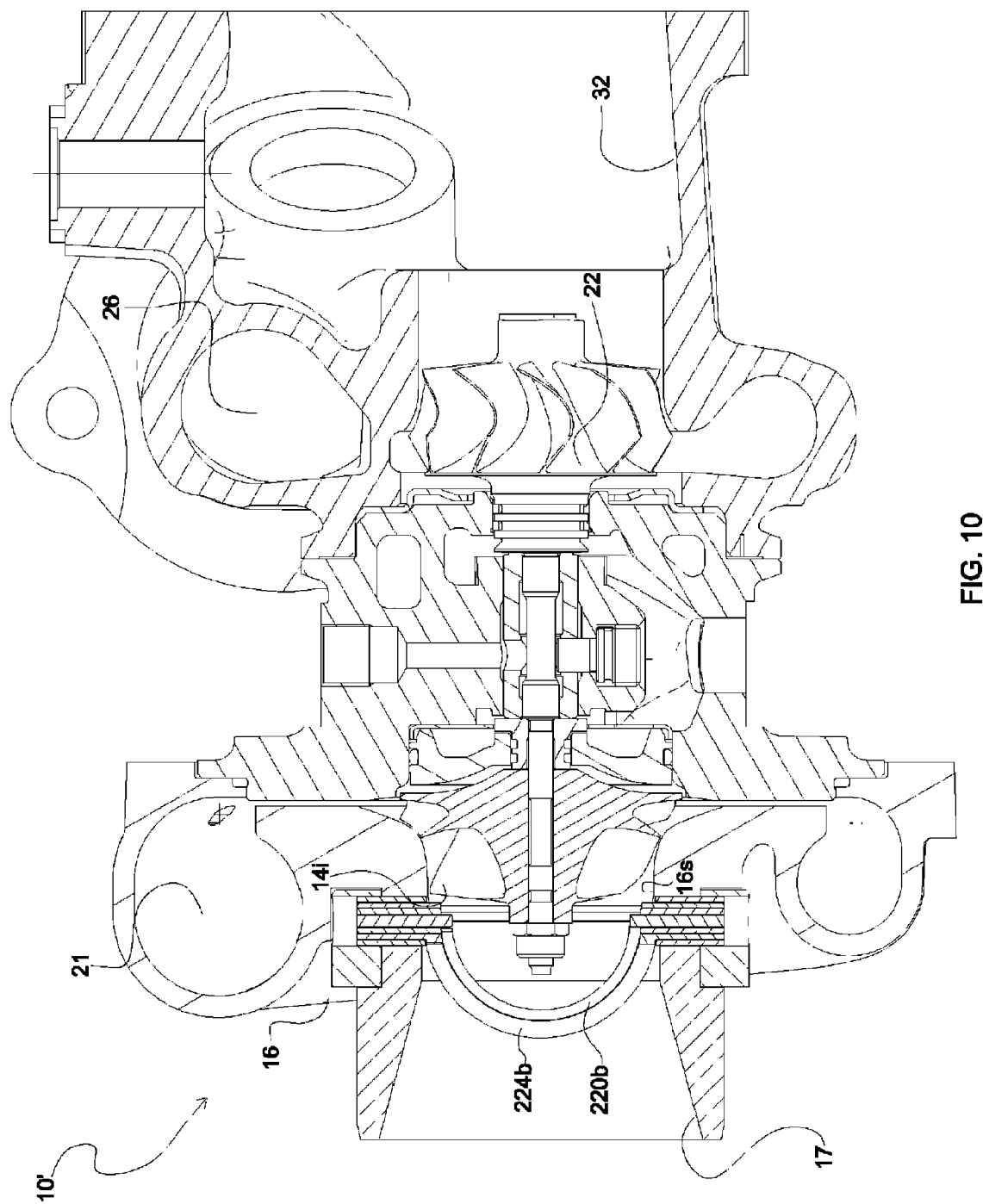
FIG. 10 is a view similar to FIG. 6, with the inlet-adjustment mechanism in the fully open position.

Finally, in the fully open position of FIGS. 6C, 9, and 10, the two inner ring halves 220a,b are pivoted in opposite directions so that the halves no longer form the inner ring, and the two outer ring halves 224a,b are also pivoted in opposite directions so they no longer form the outer ring. As best seen in FIG. 9, in this open position, the ring halves present a relatively small impediment to the flow and therefore the flow fills the entire inlet 17 so that the effective inlet diameter is dictated by that of the shroud surface 16s of the compressor housing.

At low flow rates (e.g., low engine speeds), the inlet-adjustment mechanism 200 can be placed in the closed position of FIGS. 5, 6, and 6A. This can have the effect of reducing the effective inlet diameter and thus of increasing the flow velocity into the compressor wheel. The result will be a reduction in compressor blade incidence angles, effectively stabilizing the flow (i.e., making blade stall and compressor surge less likely). In other words, the surge line of the compressor will be moved to lower flow rates (to the left on a map of compressor pressure ratio versus flow rate).

At intermediate flow rates, the inlet-adjustment mechanism 200 can be partially opened as in FIGS. 6B, 7, and 8. This can have the effect of reducing the effective inlet diameter to correspond to the outer ring diameter, and thus of increasing the flow velocity into the compressor wheel. The result will be a reduction in compressor blade incidence angles, effectively stabilizing the flow at the compressor.

At high flow rates, the inlet-adjustment mechanism can be fully opened as in FIGS. 6C, 9, and 10. Hence, the compressor regains its high-flow performance and choke flow essentially as if the inlet-adjustment mechanism were not present and as if the compressor had a conventional inlet matched to the wheel diameter at the inducer portion of the wheel.

Thus, the two concentric orifice rings 220, 224 provide three different trim settings for the compressor.

As those skilled in the art will readily perceive, the concept of multiple concentric orifice rings formed in halves, as described above, can easily be extended to more than two such orifice rings. For example, three such rings can be provided for providing four different trim settings for the compressor.

Figure 11:
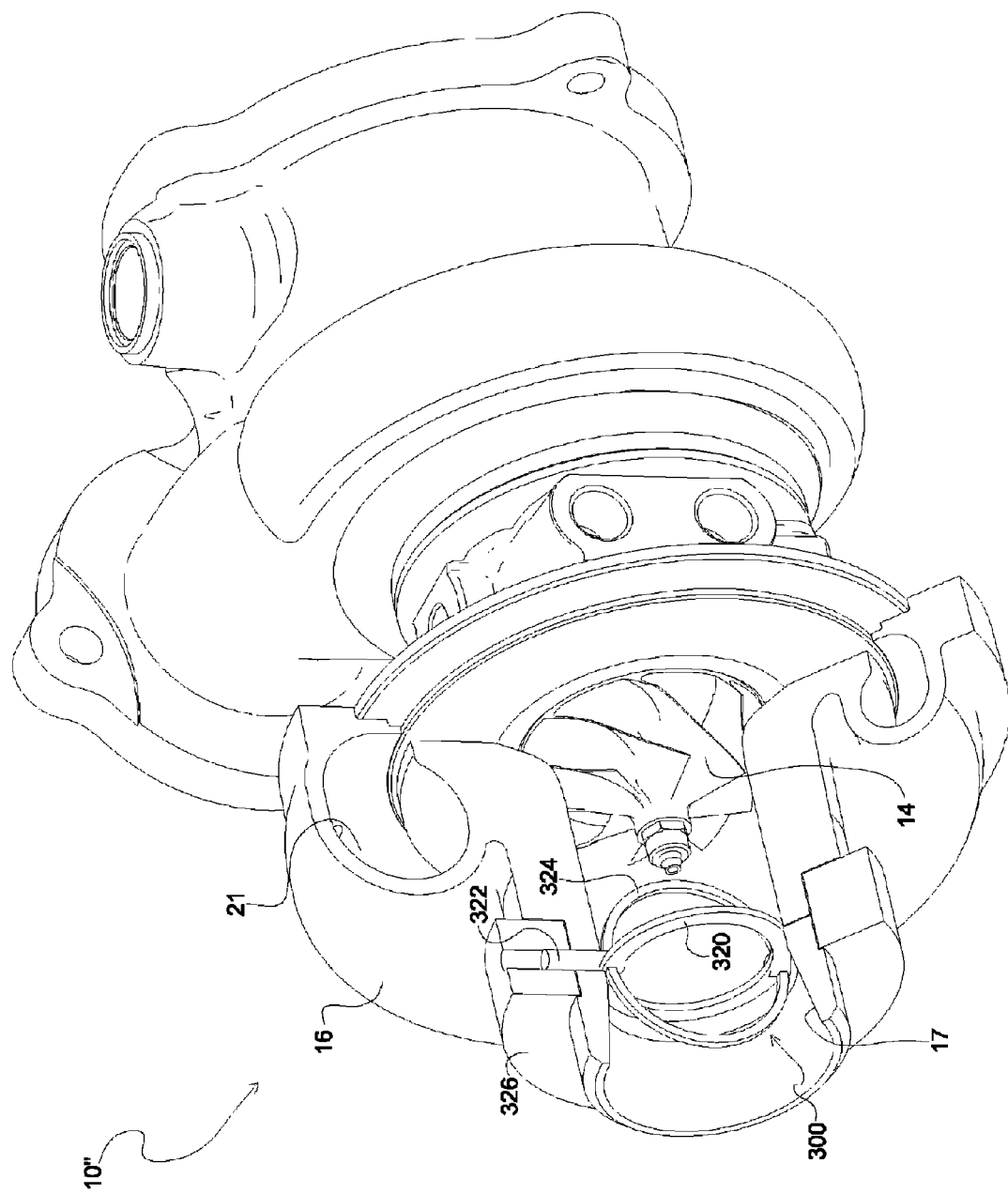
FIG. 11 is a perspective view of a turbocharger, with a portion of the compressor housing cut away to show internal details, in accordance with a further embodiment of the invention, wherein the inlet-adjustment mechanism is in the closed position.
Figure 12:
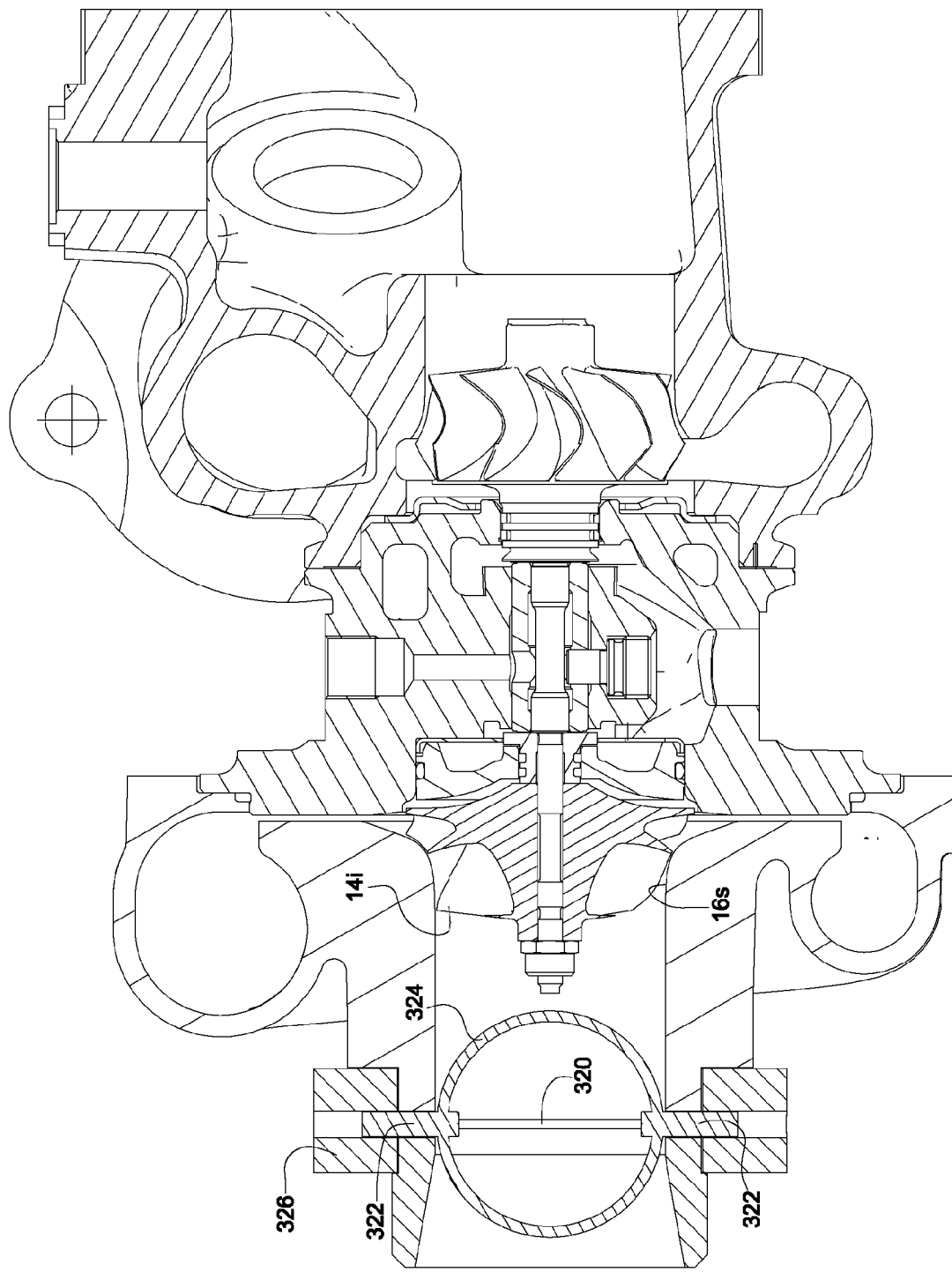
FIG. 12 is an axial cross-sectional view of the turbocharger of FIG. 11, with the inlet-adjustment mechanism in the closed position.

A third embodiment of the invention is depicted in FIGS. 11-12. The turbocharger 10'' of the third embodiment is generally similar to that of the first and second embodiments, differing primarily in the structure of the inlet-adjustment mechanism 300. The inlet-adjustment mechanism of the third embodiment is a variable-geometry orifice having a rigid one-piece inner ring 320 joined to a rigid one-piece outer ring 324 so that the respective planes in which the two rings lie are angularly displaced from one another. In the illustrated embodiment, the angular displacement is substantially 90 degrees, but it is not essential that the displacement be 90 degrees; it is only required that the displacement be sufficiently large so that when one of the rings has its plane perpendicular to the compressor wheel's axis, the other ring does not present any significant impediment to the air flow and thus does not act as an orifice. Generally, however, a displacement of 90 degrees is advantageous in that the inactive ring will be aligned with the flow and thus will cause the least flow disturbance.

The two joined rings 320, 324 are attached to axles 322 that are pivotable within bores formed in a support member 326. The orifice structure thus is pivotable about the axis defined by the axles. The inner ring 320 defines an inner diameter that is smaller than that of the outer ring 324, and both rings' inner diameters are smaller than the diameter of the compressor shroud surface 16s. When the inner ring 320 is positioned perpendicular to the flow as in FIGS. 11 and 12, the inner diameter of the inner ring determines the orifice diameter. When the structure is pivoted to place the outer ring 324 perpendicular to the flow (not illustrated), it is the outer ring that sets the orifice diameter, which is larger than that provided by the inner ring. Thus, two different effective inlet diameters can be provided by the variable-geometry orifice 300.

As a variation on this embodiment, there can be only a single ring whose inner diameter is reduced relative to the shroud diameter 16s. The ring is set parallel to the flow in the open position and perpendicular to the flow in the closed position.

A further variation is to include multiple concentric one-piece rings that are independently pivotable about a common axis (similar to the embodiment of FIGS. 5-10), each ring being pivotable between positions parallel to and perpendicular to the flow. There can be two or more of such concentric one-piece rings.

Finally, a fourth embodiment of the invention is illustrated in FIGS. 13-16. The turbocharger 10''' of the fourth embodiment is generally similar to that of the previous embodiments, differing primarily in the structure and function of the variable-geometry orifice 400. The variable-geometry orifice 400 comprises a plurality of arcuate part-ring segments 402 that collectively form a full annular ring 404. The segments are movable radially inwardly and outwardly between a closed position and an open position. In the closed position the segments are moved radially inwardly to form the annular ring 404 such that the effective diameter of the air inlet at the inducer portion of the compressor wheel is dictated by the inner diameter of the annular ring. In the open position the segments are moved radially outwardly such that the effective diameter of the air inlet at the inducer portion of the compressor wheel is dictated by the shroud surface 16s of the compressor housing. The segments 402 can be actuated to move between the open and closed positions by any suitable mechanism. For example, the segments 402 can move within an annular track 408 and arms 406 can be attached to the segments, the arms extending radially outwardly from the segments for engagement in slots 412 defined in a rotatable actuator ring 410. Rotation of the ring 410 causes the arms 406 to travel along the slots 412, which vary in radius in the circumferential direction, such that radial movement is imparted to the arms 406 and hence to the segments 402. By rotating the ring 410 in one direction, the segments 402 are moved radially inwardly; rotating the ring in the opposite direction moves the segments radially outwardly.

Figure 13:
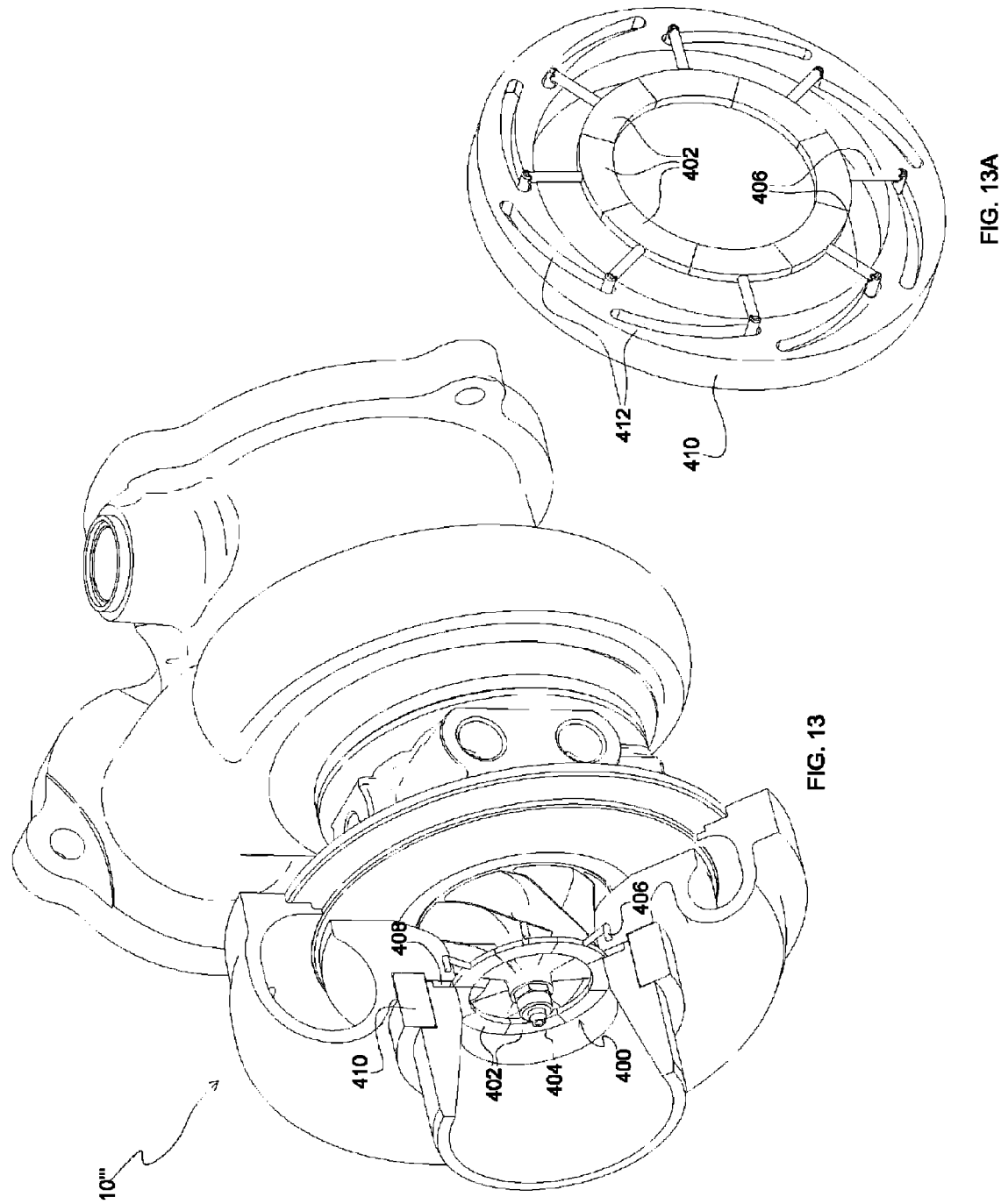
FIG. 13 is a perspective view of a turbocharger, with a portion of the compressor housing cut away to show internal details, in accordance with a still further embodiment of the invention, wherein the inlet-adjustment mechanism is in the closed position.
Figure 14:
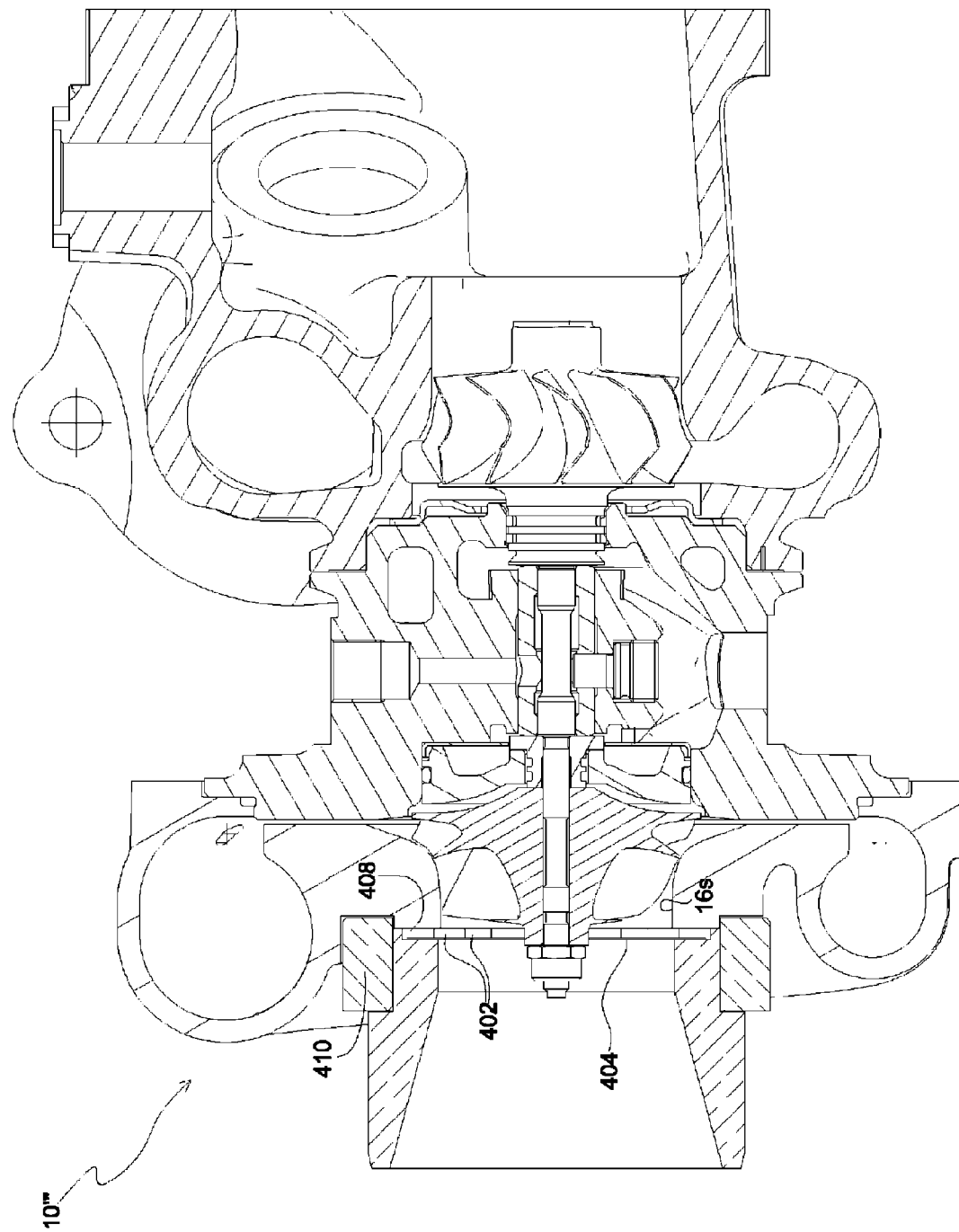
FIG. 14 is an axial cross-sectional view of the turbocharger of FIG. 13, with the inlet-adjustment mechanism in the closed position.
Figure 15:
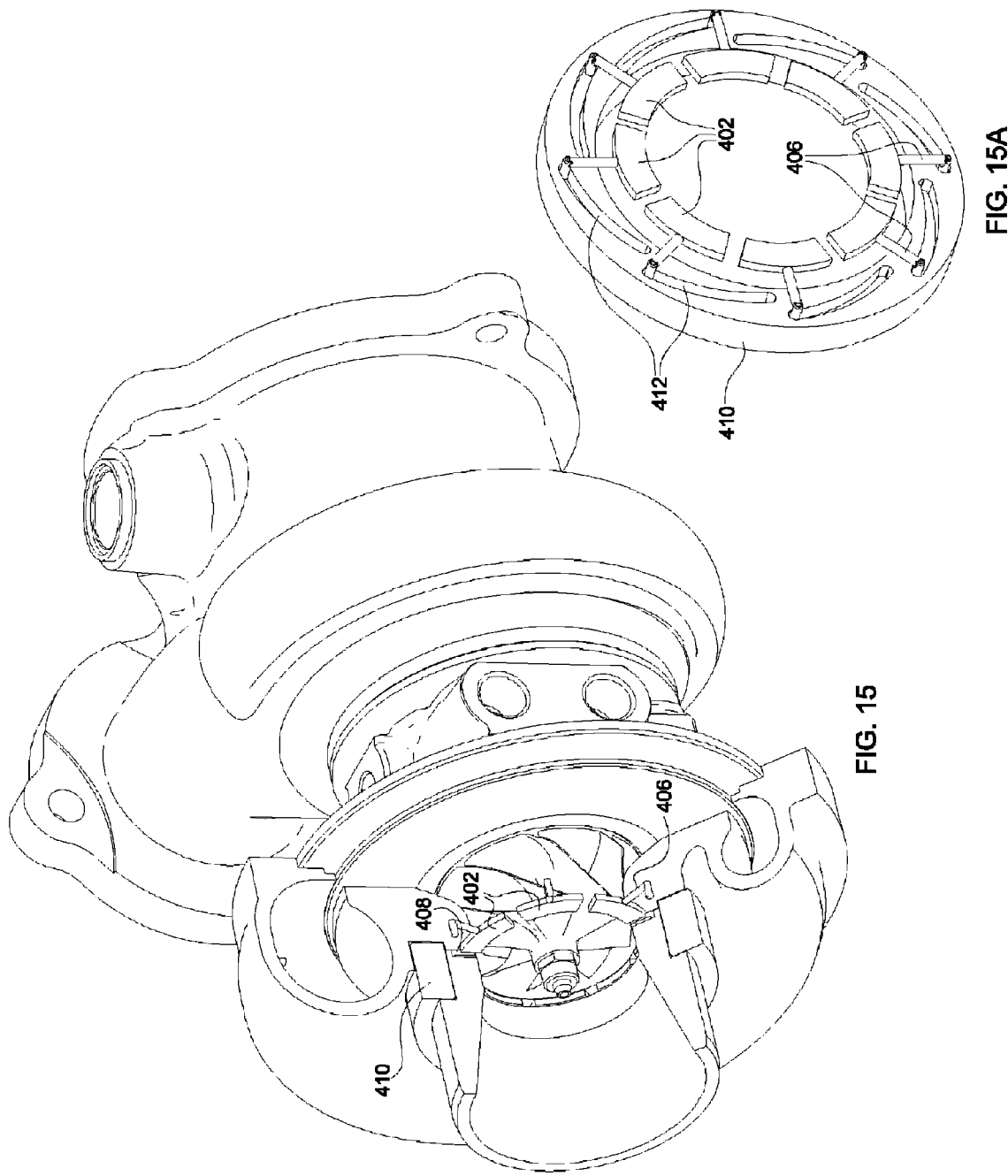
FIG. 15 is a view similar to FIG. 13, with the inlet-adjustment mechanism in the open position.
Figure 16:
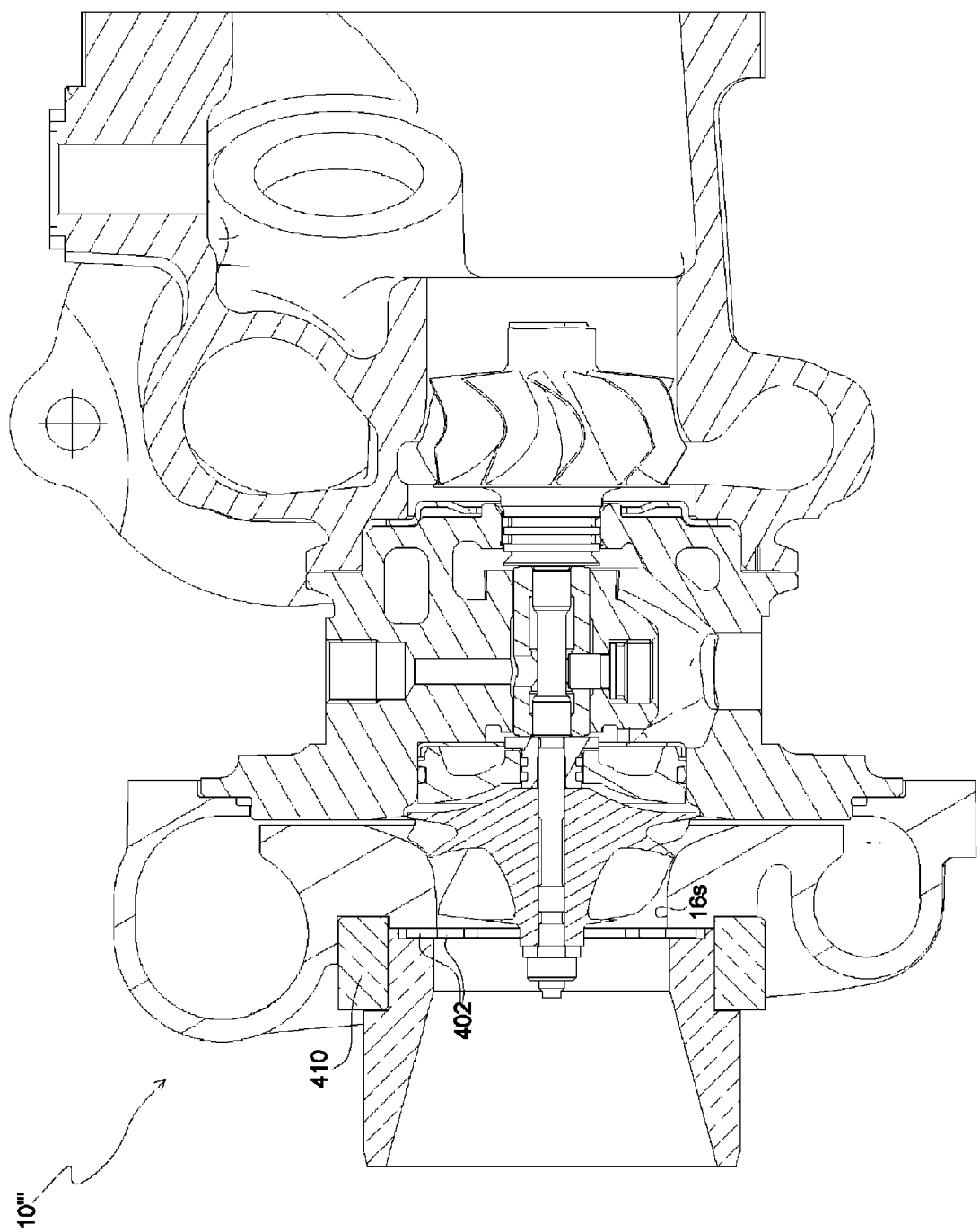
FIG. 16 is a view similar to FIG. 14, with the inlet-adjustment mechanism in the open position.

The closed position of the variable-geometry orifice is shown in FIGS. 13 and 14, and the open position is shown in FIGS. 15 and 16.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A turbocharger, comprising:
a turbine housing and a turbine wheel mounted in the turbine housing and connected to a rotatable shaft for rotation therewith, the turbine housing receiving exhaust gas and supplying the exhaust gas to the turbine wheel;
a centrifugal compressor assembly comprising a compressor housing and a compressor wheel mounted in the compressor housing and connected to the rotatable shaft for rotation therewith, the compressor wheel having blades and defining an inducer portion, the compressor housing defining an air inlet for leading air generally axially into the compressor wheel, the compressor housing further defining a volute for receiving compressed air discharged generally radially outwardly from the compressor wheel, the air inlet having an inner surface that extends for an axial length along a downstream direction, followed by a shroud surface that is adjacent to outer tips of the blades of the compressor wheel; and
a compressor inlet-adjustment mechanism disposed in the air inlet of the compressor housing and movable between an open position and a closed position, the inlet-adjustment mechanism comprising a variable-geometry orifice, the variable-geometry orifice in the closed position having an inner diameter that is smaller than an inner diameter of the shroud surface of the compressor housing at the inducer portion of the compressor wheel, and the variable-geometry orifice in the closed position being positioned such that the effective diameter of the air inlet at the inducer portion is determined by the inner diameter of the variable-geometry orifice, the variable-geometry orifice in the open position being moved such that an effective diameter of the air inlet at the inducer portion is determined by the shroud surface, the inlet-adjustment mechanism further comprising a rotatable actuator member engaged with the variable-geometry orifice for moving the variable-geometry orifice between the open and closed positions,
wherein the variable-geometry orifice comprises a first annular ring formed in two semi-annular halves that are pivotable about a common axis extending transversely to the rotation axis of the compressor wheel, in the closed position the two halves of the first annular ring being substantially co-planar so as to form the first annular ring, in the open position the two halves being pivoted in opposite directions so that the halves no longer form the first annular ring.

2. The turbocharger of claim 1, wherein the rotatable actuator member includes gears and the two halves of the first annular ring are attached to axles that have gears meshed with the gears of the rotatable actuator member such that rotation of the rotatable actuator member causes the two halves of the first annular ring to be pivoted via the respective gears.

3. The turbocharger of claim 1, wherein the variable-geometry orifice further comprises a second annular ring arranged such that the first and second annular rings comprise concentric inner and outer annular rings, respectively each formed in two semi-annular halves, all four of the halves being pivotable about the common axis extending transversely to the rotation axis of the compressor wheel, and the rotatable actuator member comprises a rotatable first actuator ring in driving engagement with the two halves of the inner annular ring and a rotatable second actuator ring in driving engagement with the two halves of the outer annular ring, in the closed position the two halves of the outer annular ring being substantially co-planar so as to form the outer annular ring and the two halves of the inner annular ring being substantially co-planar so as to form the inner annular ring, such that the effective diameter of the air inlet at the inducer portion of the compressor wheel is dictated by the inner diameter of the inner annular ring, the variable-geometry orifice having a partially open position in which the two halves of the inner annular ring are pivoted in opposite directions so that these halves no longer form the inner annular ring, but the two halves of the outer annular ring are still co-planar to form the outer annular ring, such that the effective diameter of the air inlet at the inducer portion of the compressor wheel is dictated by the inner diameter of the outer annular ring, and in the open position the two halves of the inner annular ring are pivoted in opposite directions so that these halves no longer form the inner annular ring, and the two halves of the outer annular ring are pivoted in opposite directions so that these halves no longer form the outer annular ring, such that the effective diameter of the air inlet at the inducer portion of the compressor wheel is dictated by the shroud surface of the compressor housing.

4. The turbocharger of claim 3, wherein each of the first and second actuator rings includes gears and the two halves of the inner annular ring are attached to axles that have gears meshed with the gears of the first actuator ring, and the two halves of the outer annular ring are attached to axles that have gears meshed with the gears of the second actuator ring.

* * * * *